March 27, 1928.
H. W. BONNEY
1,663,582
SELF ADJUSTING CONNECTING ROD
Filed Nov. 1, 1926
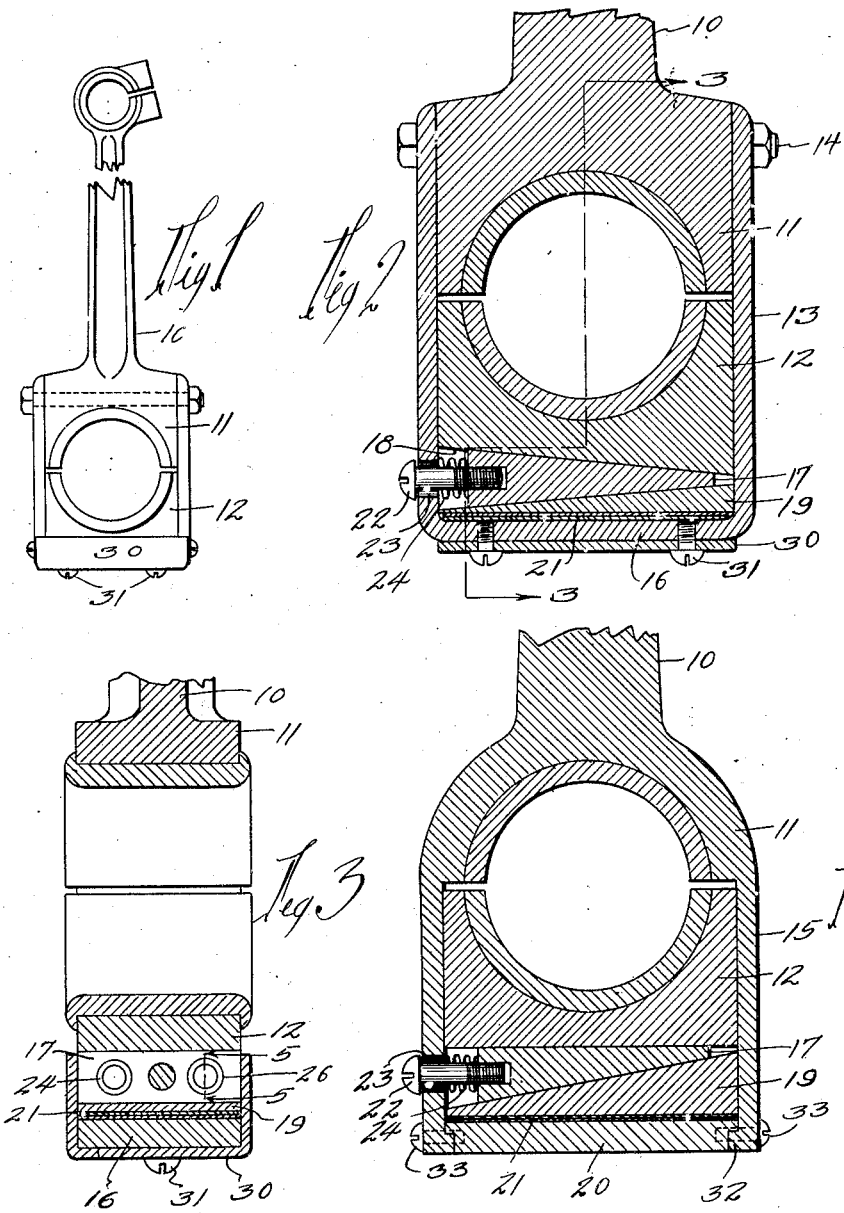
Inventor
Homer W. Bonney
By Larry R. Latta
Attorney Patented Mar. 27, 1928.

1,663,582

UNITED STATES PATENT OFFICE.

HOMER W. BONNEY, OF KINGSLEY, IOWA.

SELF-ADJUSTING CONNECTING ROD.

Application filed November 1, 1926. Serial No. 145,611.

The object of my invention is to provide a connecting rod having a bearing cap which is so mounted relative to the remainder of the rod that it will be maintained at all times in close contact with the shaft which the rod bearing encircles.

More specifically, it is my object to provide a connecting rod having a bearing including an integral portion and a cap urged toward said portion by spring pressure.

A further object of the invention is to provide such a construction in which the cap can not be forced back against the spring under the impact of the crank shaft during its revolution.

With these and other objects in view, my invention consists in the construction, arrangement and combination of the various parts of my device, whereby the objects contemplated are attained, as hereinafter more fully set forth, pointed out in my claims, and illustrated in the accompanying drawings, in which:

Fig. 1 is a side elevation of a connecting rod embodying my invention.

Fig. 2 is an enlarged, sectional view through the adjustable bearing of the rod.

Fig. 3 is a transverse, sectional view taken on line 3—3 of Fig. 2.

Fig. 4 is a view similar to Fig. 2 of a somewhat modified form of the invention.

Fig. 5 is a detail, sectional view taken on the line 5—5 of Fig. 3.

I am aware that it is not new to provide a connecting rod having an adjustable cap urged toward the integral portion of the bearing by means of spring pressure; however, where the pressure of the spring is allowed to act directly against the cap in a direction longitudinally of the rod, the impact of the crank shaft against the cap will be sufficient to compress the spring and thus move the cap away from the rod at each revolution of the shaft. This causes knocking and such a rod is therefore not successful. Were the spring to be made sufficiently heavy to withstand this impact without giving, the pressure created between the shaft and its bearing would be such as to cause an excessive amount of friction. The present invention, therefore, has its aim to provide a rod in which the cap is movable toward the integral portion of the bearing under just sufficient spring pressure to take up any play that may occur in the bearing, means being provided to transmit the pressure of the spring to the cap in such a way that the pressure from the impact of the crank shaft can not be transmitted back to the spring.

Briefly, it may be stated that this result is accomplished by interposing a wedge between the spring and the cap, the wedge having such a pitch that even when well lubricated, the co-acting cap and wedge surfaces and the co-acting wedge surface and surface of the frame containing the cap and wedge, will produce sufficient friction under such pressure to prevent the wedge being driven back against the spring.

The invention may be embodied in several forms, each including generally a connecting rod 10 and a bearing member 11, formed integrally therewith. In one form of the invention, a frame for the movable cap 12 is formed by means of a U-shaped yoke 13, the arms of which embrace the bearing portion 11 and are secured thereto by bolts 14 and, in another form, a pair of arms 15 formed integrally with the bearing member 11.

The connecting arm 16 of the yoke 13 serves as a means to support the wedge in contact with the movable cap 12. The wedge 17 may be either of the double inclined face type shown in Fig. 2 and co-acting with an inclined face 18 on the bearing member 12 or may have only a single inclined face bearing either against the cap 12 or against the secondary wedge 19 as in Fig. 4. Where an inclined face is opposed to the portion 16 of the yoke 13, the secondary wedge 19 is used.

It will be seen, however, that the wedge 19 could be dispensed with by engaging the wedge 17 directly against the arm 16 or the arm 20 of the form shown in Fig. 4.

An advantage in using the secondary wedge 19 lies in the fact that it is thus possible to employ shims 21 to initially gauge the fitting of the cap 12 relative to the crank shaft. In thus fitting the bearing to the crank shaft, the wedge 17 is secured to that arm of the yoke 13 which is adjacent its wider end by means of a screw 22 extended through a slot 23 in the arm and threaded into the wedge as shown in Figs. 2 and 4. The slot 23 takes care of such movement of the wedge longitudinally of the rod as may be necessary to give the correct relation of the parts in fitting to the shaft.

The wedge is urged in the direction of its smaller end by means of a pair of springs 24, In fitting the connecting rod to a shaft, the bolts 14 are removed, the cap and wedge assembly, including the yoke 13, is removed, and the upper portion of the bearing placed in contact with the shaft. The cap assembly is then applied to the shaft and secured to the rod by means of the bolts 14. Before applying the cap assembly, the wedge 17 is drawn in the direction of its larger end by means of a screw 22. Were this not done, the springs 24 would push the wedge against the opposite arm of the yoke 13 and move the cap 12 in the direction of the bearing member 11 to such an extent that it would be impossible to insert the bolts 14.

After the bolts 14 have been inserted, the screw 22 may then be loosened to allow the wedges to automatically assume the proper relation for maintaining the cap 12 in engagement with the shaft. The screw is then removed.

The springs 24 are small and exert very little pressure against the wedge 17. They are preferably made with enough turns to give considerable resiliency and sufficient range of action to move the wedge 17 the distance comprising the difference between the length of the wedge and the distance between the arms 13. The springs are, therefore, made considerably longer than this distance of movement and are received in openings 26 in the wedge to a considerable depth as shown in Fig. 5. It will be understood that the pressure of the spring is not sufficient to force the wedge against the friction between its sides and the cap and wedge 19 when there is any pressure between said sides, such as, for instance, that caused by engagement of the crank shaft. The pressure of the springs is not sufficient to drive the respective members of the bearing against the shaft so as to reduce the normal oil film which must be present between the moving surface of shaft and bearing. The oil film will be sufficient to maintain the bearing members their correct distance apart against the pressure of the springs. I therefore employ springs which are delicate in construction.

It would appear, from the foregoing, that if the pressure of the spring were not sufficient to squeeze the oil film from between the bearing members and shaft, that it would not be sufficient to maintain the cap 12 in the close relationship with the shaft which is necessary in an efficient bearing. I have found, however, that the pounding to which the bearing is subjected serves to release the pressure upon the wedge at each revolution of the crank shaft to such an extent that the feeble pressure of the spring is sufficient to drive the wedge in to the position necessary to take up any slack that may have occurred between the bearings.

The wedges and shims are retained against lateral movement by a cap 30 secured to the member 16 or 20, as the case may be, by means of screws 31.

The member 20, as shown in Fig. 4, is removable in order to allow the more convenient replacement of shims and wedges being secured by the hooks 32 on the ends of the arms 15 and by screws 33.

Some changes may be made in the construction and arrangement of the parts of my invention without departing from the real spirit and purpose of my invention, and it is my intention to cover by my claims, any modified forms of structure or use of mechanical equivalents, which may be reasonably included within their scope.

I claim as my invention:

1. A self-adjusting connecting rod for automobiles, comprising a rod having an integral bearing member, a pair of arms secured to said rod and extending beyond said bearing member, an element connecting said arms to form therewith a closed loop projecting beyond the bearing member, a fixed wedge mounted against said element, a movable cap freely received within said loop and coacting with the fixed bearing member, a movable wedge slidable longitudinally between the fixed wedge and the movable cap, a spring compressed between the thick end of the movable wedge and one of the arms, said last mentioned arm being provided with an elongated slot extending longitudinally thereof, a screw adjustably threaded into the thick end of the movable wedge and extending through said slot and a retaining cap, U-shaped in cross section, secured to said element and partially covering the loop on either side of the arms so as to inclose said wedges and a portion of the movable cap.

2. A self-adjusting connecting rod, for automobiles, comprising a rod having an integral bearing member, a pair of arms secured to said rod and extending beyond said bearing member, an element connecting said arms to form therewith a closed loop projecting beyond the bearing member, a fixed wedge mounted against said element, a movable cap freely received within said loop and co-acting with the fixed bearing member, a movable wedge slidable longitudinally between the fixed wedge and the movable cap, a spring compressed between the thick end of the movable wedge and one of the arms, a retaining cap, U-shaped in cross section, secured to said element and partially covering the loop on either side of the arms so as to inclose said wedges and a portion of the movable cap.

3. A self-adjusting connecting rod, for automobiles, comprising a rod having an integral bearing member, a pair of arms secured to said rod and extending beyond said bearing member, an element connecting said arms to form therewith a closed loop projecting beyond the bearing member, a fixed wedge mounted against said element, a movable cap freely received within said loop and co-acting with the fixed bearing member, a movable wedge slidable longitudinally between the fixed wedge and the movable cap, a spring compressed between the thick end of the movable wedge and one of the arms, a retaining cap, U-shaped in cross section, secured to said element and partially covering the loop on either side of the arms so as to inclose said wedges and a portion of the movable cap and a shim received between the fixed wedge and said element and retained by said retaining cap.

4. A self-adjusting connecting rod for automobiles, comprising a rod having an integral bearing member, a pair of arms secured to said rod and extending beyond said bearing member, an element connecting said arms to form therewith a closed loop projecting beyond the bearing member, a fixed wedge mounted against said element, a movable cap freely received within said loop and co-acting with the fixed bearing member, a movable wedge slidable longitudinally between the fixed wedge and the movable cap, a spring compressed between the thick end of the movable wedge and one of the arms, a retaining cap, U-shaped in cross section, secured to said element and partially covering the loop on either side of the arms so as to inclose said wedges and a portion of the movable cap, the ends of said arms being provided with inwardly extending shoulders and said element having portions resting against said shoulders and screws extended through said arms and threaded into said element.

Signed this 29th day of October, 1926, at Sioux City, in the county of Woodbury and State of Iowa.

HOMER W. BONNEY.